Sept. 18, 1962  R. J. KIESER  3,054,982
HYDROSTATIC PRESSURE TRANSDUCER
Filed Feb. 16, 1959
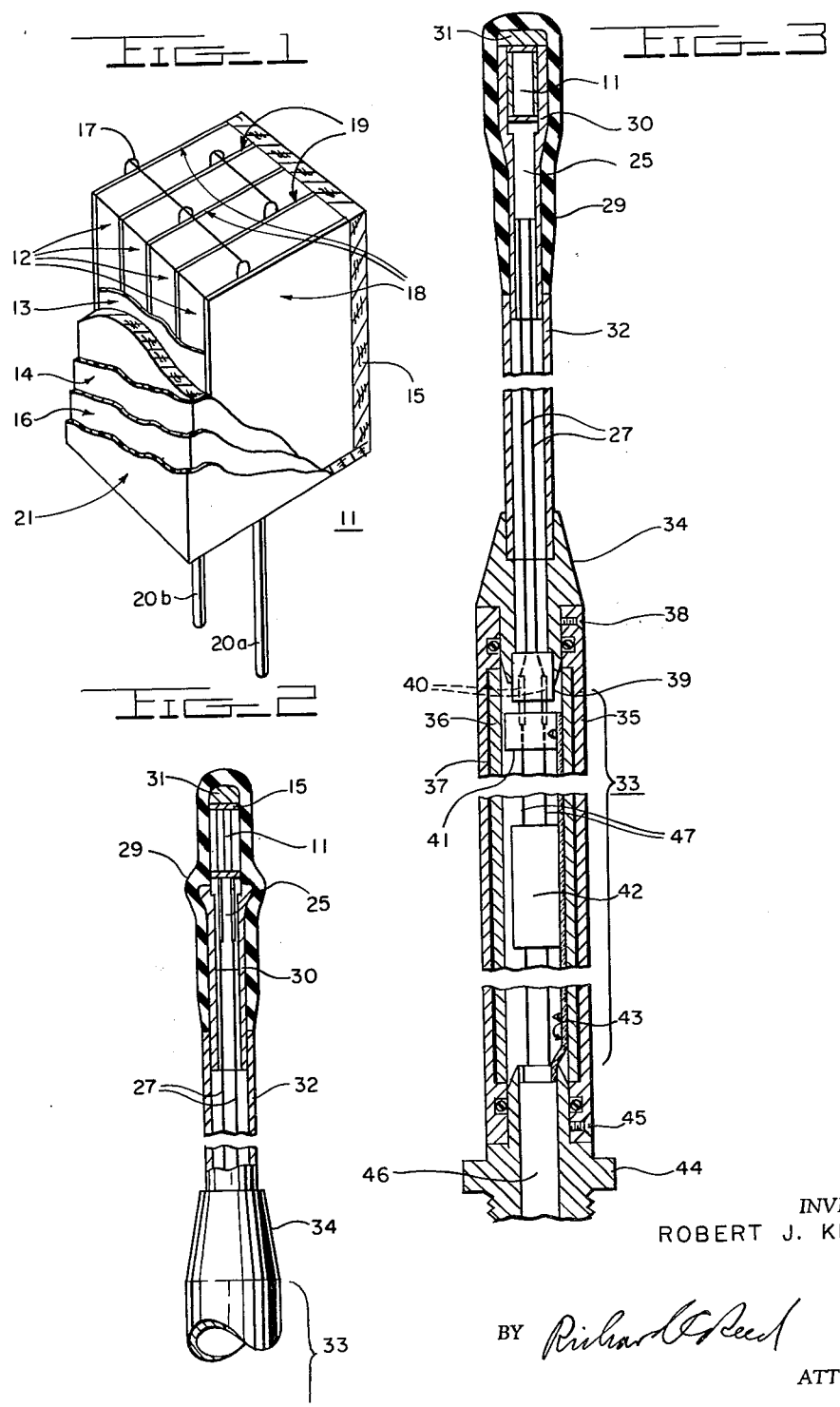
INVENTOR
ROBERT J. KIESER
BY Richard C. Reed
ATTORNEY

United States Patent Office 3,054,982
Patented Sept. 18, 1962

3,054,982
HYDROSTATIC PRESSURE TRANSDUCER
Robert J. Kieser, Orlando, Fla., assignor to the United States of America as represented by the Secretary of the Navy
Filed Feb. 16, 1959, Ser. No. 793,650
5 Claims. (Cl. 340—10)
(Granted under Title 35, U.S. Code (1952), sec. 266)

The invention described herein may be manufactured and used by or for the Government of the United States of America for governmental purposes without the payment of any royalties thereon or therefor.

This invention relates in general to transducers capable of receiving or generating compressional waves in a liquid medium, and in particular to an underwater transducer capable of operating over a wide frequency range while under considerable hydrostatic pressure.

The prior art discloses transducers for converting underwater sound vibrations to electrical vibrations, and conversely, but with considerable limitation in frequency range for each transducer as well as in ability to withstand hydrostatic pressure. Most prior hydrostatic pressure transducers are so large as to materially affect the sound field; these cannot satisfactorily be used for some measurements of plane wave sound fields, e.g., reflection and absorption, because of their size. Few, if any, existing hydrostatic pressure transducers will operate effectively at frequencies as low as 10 cycles per second, and few low frequency transducers are capable of omnidirectional or bidirectional operation. Those low frequency hydrostatic pressure transducers which are designed to withstand pressures approaching 1000 p.s.i. gauge are subject to appreciable damage at such pressures which frequently causes a substantial change in their acoustical characteristics. Many of the disadvantages of the prior art devices are remedied or otherwise avoided in the transducer of the present invention.

Accordingly, it is an object of the present invention to provide a hydrostatic pressure transducer capable of withstanding hydrostatic pressure up to 1000 p.s.i. gauge while having less than 5 decibels change in its receiving response.

Another object of this invention is to provide a hydrostatic pressure transducer of light weight and small size so as to cause a minimum disturbance of the sound field.

A further object of the present invention is to provide a hydrostatic pressure transducer which is operable over a frequency range of from 10 cycles per second to 400 kilocycles per second.

A further object of this invention is to provide a hydrostatic pressure transducer which is omnidirectional for frequencies up to 50 kilocycles per second.

A further object of the present invention is to provide a hydrostatic pressure transducer which is bidirectional over a wide range of frequencies.

A further object of this invention is to provide a hydrostatic pressure transducer having opposite faces within one decibel of the same sensitivity over a wide range of frequencies.

Other objects and advantages of this invention will become apparent upon a careful consideration of the following description when read in conjunction with the following drawings in which like reference numerals designate like parts throughout the figures thereof and wherein:

FIG. 1 shows an isometric view, partly in section, of the crystal assembly and its receptacle.

FIG. 2 is an isometric view, partly in section, of a first embodiment of the present invention.

FIG. 3 is another isometric view, in cross-section, of the embodiment shown in FIG. 2 rotated 90 degrees.

In accordance with the teachings of the present invention, a hydrostatic pressure transducer is provided which can be operated over a wide frequency range under pressures greatly exceeding those that cause physical damage to existing transducers or electrical damage such as a distortion of their acoustical characteristics. The present invention's greater compactness permits measurements of reflection and absorption not formerly possible and, in addition, it is omnidirectional for a portion of its frequency range and bidirectional for the remainder thereof. In a preferred embodiment, four lithium sulphate crystals are cemented together and electrically connected in parallel. The crystal assembly is surrounded on four sides by acoustic isolation material and is mounted in a metal frame which protects all but the end faces of the assembly. Sheet mica is inserted between the faces and the acoustic isolation material, and coatings of polychloroprene and silver paint further protect the assembly.

Referring to FIG. 1, crystal assembly 11 includes four lithium sulphate crystals 12 cemented together and electrically connected in parallel by means of tabs 17. Cable coupling terminals 20a and 20b are connected each to a tab similar to tabs 17 on the opposite face of the assembly, the low potential terminal 20a being connected in common to exposed electrodes 18, which cover the outer end faces, and the center electrode, and the high potential terminal 20b being electrically connected in common to the intermediate electrodes 19. The four remaining surfaces of the assembly, termed "side faces," have sheet mica 13 cemented over them which serves to limit resistance leakage between electrodes, and then are coated with an acoustic isolation material 15 such as corprene which has been carefully cut for a close fit. The acoustic isolation material serves to isolate the crystals from the casing while absorbing only a minimum amount of vibration. The assembly 11 is then completely coated with a plastic film 14 which serves as an acoustic coupling medium between the crystals and the medium in which the transducer is immersed. To apply this plastic coating, the assembly is first immersed in an elastomer such as polychloroprene in solution under vacuum and then removed after the vacuum has been reduced to atmospheric pressure thereby leaving protective film 14 free of air packets. A shield of silver paint 16 is next applied which completely surrounds the crystals and provides electrostatic shielding. Thereafter, an additional layer of polychloroprene is applied insuring stability of operation over long periods of time. In a typical embodiment the depth of coatings 14, 16 and 21 may be substantially $\frac{1}{16}$ inch.

Referring to FIG. 2, cable coupling terminals 20a and 20b of crystal assembly 11 are shown fitted into receptacle 25 which in turn is mounted in metal frame 30, the frame serving to support the assembly and having open areas so that the end faces are exposed to sound waves through resilient watertight casing 29. A metal cap 31 completes the enclosure of metal frame 30 around crystal assembly 11. Frame 30 is fitted into tubular metal extension 32 which in turn is fitted into pre-amplifier case 33 by means of a metal coupler 34.

Referring to FIG. 3, pre-amplifier case 33 has a stainless steel sleeve 35 adhered over a brass sleeve 36, or a sleeve of a material having a substantially different modulus of elasticity than that of sleeve 35, by resilient cement bonding 37, bonding of this type is old and well known, as disclosed in the publication by George Epstein, Adhesive Bonding of Metals, Reinhold Publishing Corporation, New York, N.Y. 1954. Enclosed in preamplifier case 33 is plug 39 which has terminals 40a and 40b adapted to fit into corresponding sockets in receptacle 41. Wires 47 connect the sockets in receptacle 41 to the input of pre-amplifier 42 the output of which is electrically connected to related amplifying and disseminating equipment, not shown, via cable 46. The pre-amplifier serves simply to increase the amplitude of crystal assembly electric signals before the signals are transmitted through cable 46 to an evaluating station. As mentioned above, the pre-amplifier case is composed of sleeves of different moduli of elasticity which are bonded together so as to substantially reduce the possibility of amplified vibrations being carried back to metal frame 39 where they could affect the crystals. Extension 43 from cable 46 mechanically connects receptacle 41 to the cable. Coupling 44 fastens the preamplifier case to the cable and is held in place by set screw 45. Watertightness is provided by a packing gland, not shown, surrounding the junction of cable 46 and coupling 44.

The transducer of the present invention will operate over a frequency range of from 10 cycles per second to 400 kilocycles per second, and will withstand hydrostatic pressure from zero to 1000 p.s.i. gauge with less than 5 decibels change in its receiving response. Its response in the direction of the acoustic axis, and 180° to this axis, are within 1 decibel over the frequency range of 10 cycles per second to 150 kilocycles per second and through a hydrostatic pressure range from zero p.s.i. to 1000 p.s.i. For frequencies up to 50 kilocycles per second the transducer is omnidirectional, and at higher frequencies it is bidirectional. The end faces are within one decibel of the same sensitivity at any frequency, and at any given pressure or frequency its receiving sensitivity is very stable with time. The small size of the present invention reduces its effect on the sound field and permits, among other things, measurements of reflection and absorption which formerly could not be made.

Many modifications and variations of the present invention are possible pursuant to the above teachings. It is therefore to be understood that its practice is not to be limited by the specific examples in the foregoing description and that this invention is only to be limited by the scope of the appended claims.

What is claimed is:

1. A hydrostatic pressure transducer comprising, a plurality of piezoelectric crystals each having a pair of opposed broad faces separated by at least one narrow edge face, said crystals being laminated with the narrow edge faces thereof aligned, electrodes sandwiched between adjacent crystals and covering the broad exposed faces thereof, each electrode being connected in common to any electrode spaced therefrom by two of said crystals, a sheet of insulating material with low electrical conductivity contacting and covering said narrow edge faces, a sheet of acoustic isolation material superimposed on said insulating material, two superimposed continuous layers of sound coupling elastomer enclosing said crystals and electrodes and a shield of electrically conducting material sandwiched between said continuous layers.

2. A transducer according to claim 1 having an even number of said crystals, whereby said conducting shield is closely spaced over large portions of its area with electrodes of only one polarity.

3. A transducer according to claim 1 wherein said insulating material consists of a sheet of mica, said sound insulating material consists of a cellular sound absorptive material and said coupling elastomer and shield of electrical conducting material consist of gas-free layers of polychloroprene with conducting paint applied to at least one of said gas-free layers.

4. A hydrostatic pressure transducer comprising a crystal assembly, a preamplifier, a housing surrounding said preamplifier, said housing including inner and outer overlapping rigid sleeves having different coefficients of elasticity which are interconnected by a resilient bonding cement, said preamplifier being mounted within said inner sleeve, said crystal assembly being mounted at one end of said outer sleeve, and at least one electrical conductor extending from said assembly to said preamplifier to couple signals therebetween.

5. The transducer according to claim 4 wherein said crystal assembly is mounted in a metal bracket surrounding a part only of said assembly and including a resilient watertight casing surrounding said assembly and bracket.

References Cited in the file of this patent
UNITED STATES PATENTS

| | | |
|---|---|---|
| 2,181,132 | Kallmeyer | Nov. 28, 1939 |
| 2,402,531 | Christian | June 25, 1946 |
| 2,413,462 | Massa | Dec. 31, 1946 |
| 2,483,677 | Swinehart | Oct. 4, 1949 |
| 2,490,236 | Shaper | Dec. 6, 1949 |
| 2,605,346 | Gogolick et al. | July 29, 1952 |